Jan. 4, 1955
E. T. YOUNG
2,698,926
CABLE CONNECTOR
Filed Dec. 7, 1951
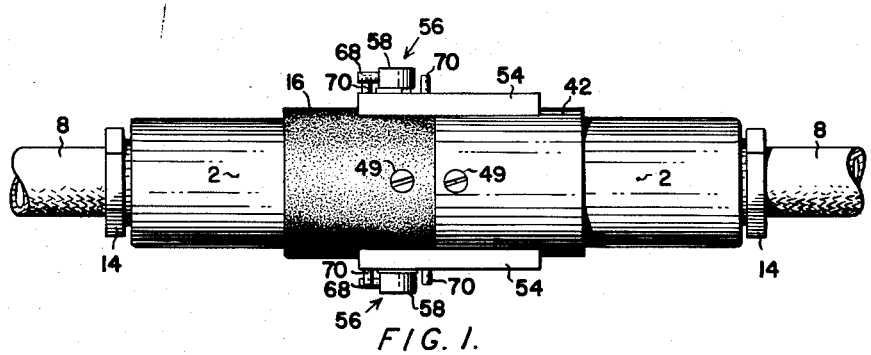
FIG. 1.
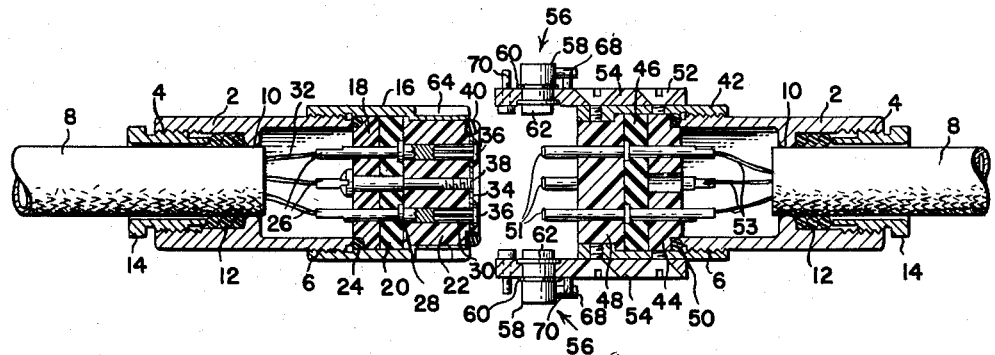
FIG. 2.
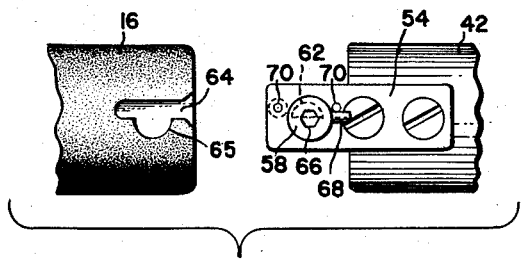
FIG. 3.
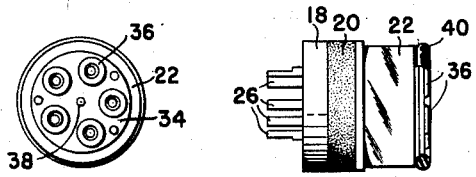
FIG. 4.　　FIG. 5.
INVENTOR.
EINAR T. YOUNG
BY
ATTORNEYS

United States Patent Office 2,698,926
Patented Jan. 4, 1955

2,698,926

CABLE CONNECTOR

Einar T. Young, Newtown Square, Pa., assignor to Sun Oil Company, Philadelphia, Pa., a corporation of New Jersey Application December 7, 1951, Serial No. 260,410

3 Claims. (Cl. 339—91)

This invention relates to an improved cable connector. The device of the present invention has particular utility in outdoor installations and, for example, may be used in electrical prospecting apparatus adapted for the detection of deep anomalies in the earth. In certain types of electrical prospecting for anomalies in the earth, a plurality of electrodes are placed on or in the earth in a predetermined pattern and are joined by cables to one or more sources of current and to potential measuring apparatus. It will be appreciated that oftentimes the connecting cables will be exposed to surface water, bore hole liquid (when one or more electrodes are in a hole) and to other types of moisture. It is generally necessary to maintain a very high resistance of the component conductors of the cable to ground and to each other, and, therefore, it is desirable to provide a cable connector which is waterproof and, hence, may be used in exposed installations of the type described above.

As an illustration of the type of apparatus for which the cable connector is adapted, reference may be made to the application of John M. Pearson, Serial No. 361,361, filed June 12, 1953.

It is, therefore, an object of this invention to provide a cable connector which when exposed to moisture will maintain high resistances between its conductors and between each of them and ground.

It is a further object of this invention to provide a waterproof cable connector especially adapted for use on outdoor electrical installations.

Referring to the accompanying drawings in which a preferred embodiment of the invention is disclosed:

Figure 1 is a plan view of the complete cable connector in the locked position;

Figure 2 is a sectional view through the cable connector showing the two parts of the housing as they appear before they are locked together;

Figure 3 is a detailed view of the locking means employed to secure the two parts of the separable housing of the cable connector together;

Figure 4 is a detailed view of a portion of the cable connector showing the insulating members surrounding the female members; and Figure 5 is a detailed view of a portion of the cable connector showing the assembly of one of the rubber sealing members.

Referring to Figures 1 and 2, the cable connector comprises a separable housing having two substantially identical cylindrical housing portions 2 which are internally threaded at one end thereof, as shown at 4, and externally threaded at the other end thereof, as shown at 6. Mounted in each of said members 2 are cables 8 which may be of any well known multiconductor, insulated type. The inner ends of cables 8 are received by shoulder portions 10 of members 2, said shoulder portions 10 also serving as retainers for packing rings 12. Packing rings 12 are of the type known as O rings and may be formed of natural rubber, synthetic rubber, fiber, or any other well known type of packing material affording high electrical resistance. Packing rings 12 are held in engagement with shoulder portions 10 of members 2 by packing nuts 14, which have threads thereon engaging with threads 4 on members 2.

Mounted on the left-hand part of the cable connector, as viewed in Figure 2, is a sleeve 16 having threads thereon engaging with the threads 6 on the member 2. Mounted within sleeve 16 is a resin impregnated fiber insulator 18, a rubber insulator 20, and a plastic insulator 22. The resin impregnated fiber insulator 18 may be of any well known type, such as resin impregnated laminated paper or laminated fabric. The rubber insulator 20 may be of either natural or synthetic rubber, while the insulator 22 may be made of any non-conducting plastic material. The fiber insulator 18 is provided with a shoulder in which is received a rubber O ring 24 which may be made of synthetic or natural rubber.

Mounted within insulating members 18, 20 and 22 are a plurality of female members 26. Female members 26 are provided with shoulder portions 28 which abut rubber insulating ring 20 and are also provided at their right-hand end, as viewed in Figure 2, with slots 30, which provide a spring finger construction. Female members 26 have connected to them, as by soldering, the conductors 32 of cable 8.

Mounted on the right-hand side of insulator 22, as viewed in Figures 2 and 4, is a metal plate 34 having a plurality of openings therein, in each of which is received a rubber insulating ring 36 surrounding the end of a member 26 and prevents contact between its associated female member 26 and said plate 34. The rings bulk outwardly beyond the exposed face of plate 34 for the purpose hereafter set forth. Plate 34 may be secured to insulating ring 22 by any convenient means, and the three rings 18, 20 and 22 are secured together by the screw 38 which is threaded into metal plate 34. Also mounted on the right-hand side of plastic ring 22 is a rubber O ring 40 mounted upon a shoulder formed on plastic ring 22. Rubber ring 40 may be made of either synthetic or natural rubber.

Referring to the right-hand side of Figure 2, member 2 has a sleeve 42 mounted thereon having threads engaging with the threads 6 on member 2, and having a fiber insulating ring 44, a rubber insulating ring 46 and a plastic insulating ring 48 which may be made of the same materials as rings 18, 20 and 22, respectively. Plastic rings 22 and 48 are secured in the separable housing by screws 49. Sleeve 42 is also provided with a rubber O ring 50 identical with ring 24.

Mounted in insulating rings 44, 46 and 48 are a plurality of male members 51 which are received in female members 26 when the device is locked together. Male members 51 are soldered to the conductors 53 of cable 8.

Mounted on sleeve 42, as by screws 52, are two members 54 having two rotary locking devices 56 thereon, certain details of which are shown in Figure 3.

Referring to Figures 2 and 3, the locking devices consist of rotatable members 58 which are secured in members 54 by snap rings 60. Formed integrally with members 58 are eccentric cams 62 which are adapted to slide in slots 64 in sleeve 16 when the two halves of the separable housing are joined together. Thus it will be appreciated that when the two halves of the separable housing are joined together and the eccentric cams 62 are rotated, the camming action securely locks the two halves of the housing together. In particular, the cams 62 are so shaped and mounted that by acting on surfaces 65 of the side extensions of slots 64 the two parts of the connector are drawn tightly together, rings 36 and 40 being strongly compressed between the plastic members 22 and 48. The rotary locking devices 56 are provided with hexagonal wells 66 for the reception of an Allen wrench and also have pins 68 secured thereto, which engage with stop pins 70.

In the use of the connector, the ends of cables 8 are secured in each end of the separable cable connector housing and are locked therein by means of packing nuts 14. By turning packing nuts 14 down, it will be appreciated that a waterproof seal is obtained around each end of the cables 8. The cable wires are connected to the male and female members, respectively, and the two parts of the connector housing are joined together by forcing eccentric members 62 into slots 64. When the two parts of the housing are joined together, the male members 51 are inserted into the female members 26. The two parts are forced together until plastic ring 48 abuts against rubber sealing ring 40. In this position it will be appreciated that rotation of the eccentric cam elements 62 causes the two halves of the connector housing to be securely locked together thus forming a tight waterproof seal between the two halves of the housing by virtue of the compression of sealing rings 40 and 36. Even if water should be present when the two connector elements are being assembled, compression of the rings 40 and 36 will insure that leakage of current could only occur between the conductors or between any of them and the exterior through the extremely thin films such as might remain between the rings and the surfaces which they engage, which films offer very high resistances. From the foregoing it is obvious that the connector provides a waterproof means for joining cables together, which is especially advantageous for use in outdoor installations.

It will be obvious to those skilled in the art that many modifications of the invention may be made without departing from the spirit thereof, and the scope of the invention is to be restricted only in accordance with the appended claims.

What is claimed is:

1. A cable connector comprising a separable housing adapted to recieve a cable in each end thereof, a male contact member mounted in one part of said separable housing, a female contact member mounted in the other part of said separable housing, and camming means on said housing for locking said separable housing together, said camming means including means extending from one part of said separable housing and mounting a cam member rotatable on an axis extending transversely of said housing and perpendicular to the longitudinal axis of said housing beyond the end of said one part, and means providing a slot in the other part of said separable housing adapted to receive said cam member, said cam member entering said slot and said contact members coming into interengagement upon longitudinal motion of said housing members.

2. A cable connector comprising a separable housing adapted to recieve a cable in each end thereof, a male contact member mounted in one part of said separable housing, a female contact member mounted in the other part of said separable housing, and camming means on said housing for locking said separable housing together, said camming means including means extending from one part of said separable housing and mounting a cam member rotatable on an axis extending transversely of said housing and perpendicular to the longitudinal axis of said housing beyond the end of said one part, and means providing a slot in the other part of said separable housing adapted to receive said cam member, said cam member entering said slot and said contact members coming into interengagement upon longitudinal motion of said housing members, and said cam member and said slot being formed to provide locking engagement with each other upon rotation of said cam member about its axis after the cam member has entered said slot.

3. A cable connector comprising a separable housing adapted to receive a cable in each end thereof, an insulating member mounted in each part of said separable housing, male contact members mounted in the insulating member in one part of said separable housing, female contact members mounted in the insulating member in the other part of said separable housing, a plate mounted adjacent to the outer ends of the female contact members, elastic insulating members surrounding each of the female contact members and retained by said plate, an elastic insulating member adjacent to the periphery of said plate and surrounding all of the female contact members, said elastic insulating members being adapted to be compressed between the contact mounting insulating members in each part of said separable housing when the two parts of said separable housing are locked together, and means on said housing for locking said separable housing together.

References Cited in the file of this patent

UNITED STATES PATENTS

| 1,540,936 | Garankin | June 9, 1925 |
| 1,978,510 | Spence, Jr. | Oct. 30, 1934 |
| 2,124,182 | Braun | July 19, 1938 |
| 2,383,926 | White | Aug. 28, 1945 |
| 2,384,267 | Andersen | Sept. 4, 1945 |
| 2,386,177 | Andersen | Oct. 9, 1945 |
| 2,428,323 | Winer | Sept. 30, 1947 |
| 2,440,279 | Larkins, Jr. | Apr. 27, 1948 |
| 2,626,975 | Rockwell | Jan. 27, 1953 |

FOREIGN PATENTS

| 213,611 | Germany | Sept. 4, 1908 |
| 466,989 | Germany | Oct. 15, 1928 |